United States Patent
Spalding et al.

(10) Patent No.: US 6,994,793 B2
(45) Date of Patent: Feb. 7, 2006

(54) PROCESS FOR REMEDIATING GROUND WATER CONTAINING ONE OR MORE NITROGEN COMPOUNDS

(75) Inventors: Roy Follansbee Spalding, Raymond, NE (US); Imtiyaz Ahmed Khan, Lincoln, NE (US)

(73) Assignee: Hydro-Trace Incorporated, Raymond, NE (US)

( * ) Notice: Subject to any disclaimer, the term of this patent is extended or adjusted under 35 U.S.C. 154(b) by 49 days.

(21) Appl. No.: 10/420,576

(22) Filed: Apr. 21, 2003

(65) Prior Publication Data
US 2003/0234224 A1 Dec. 25, 2003

Related U.S. Application Data

(60) Provisional application No. 60/373,911, filed on Apr. 19, 2002.

(51) Int. Cl.
*C02F 1/72* (2006.01)
(52) U.S. Cl. .................. 210/747; 210/754; 210/756; 210/758; 210/903
(58) Field of Classification Search ............... 210/747, 210/754, 756, 758, 903
See application file for complete search history.

(56) References Cited

U.S. PATENT DOCUMENTS

| | | | |
|---|---|---|---|
| 4,137,166 A | | 1/1979 | Heimberger et al. |
| 4,160,724 A | * | 7/1979 | Laughton .................... 210/605 |
| 5,126,049 A | * | 6/1992 | Hallberg ..................... 210/605 |
| 6,054,058 A | | 4/2000 | Joko et al. |
| 6,132,627 A | * | 10/2000 | Joko et al. .................. 210/748 |
| 6,332,986 B1 | * | 12/2001 | Johnson et al. ............. 210/758 |
| 6,406,628 B1 | * | 6/2002 | Chang et al. ............... 210/605 |
| 6,447,682 B1 | * | 9/2002 | Flowers ...................... 210/602 |

* cited by examiner

*Primary Examiner*—Betsey Morrison Hoey
(74) *Attorney, Agent, or Firm*—Banner & Witcoff, Ltd.

(57) ABSTRACT

A process for treating ground water containing nitrogen compounds, including ammonia, urea and nitrate, is provided. The ground water is extracted downgradient of the source of contamination and mixed with a chemical oxidant to oxidize the nitrogen component to nitrogen gas. The chemical oxidant may be any suitable oxidant, including a halogenated oxidant, such as a hypochlorite, hypobromite or hypoiodite compound, and Fentons reagent, or combinations thereof. The ground water can be further treated as desired to remove residual oxidants, as well as nitrate, to provide a processed water having characteristics suitable for discharge with limited to no adverse impact on the discharge environment.

20 Claims, 2 Drawing Sheets

PROCESS FOR REMEDIATING GROUND WATER CONTAINING ONE OR MORE NITROGEN COMPOUNDS

CROSS-REFERENCE TO RELATED APPLICATIONS

This application claims the benefit of U.S. Provisional Patent Application No. 60/373,911, filed Apr. 19, 2002, which is incorporated herein by reference.

BACKGROUND OF THE INVENTION

Urea, ammonia, and nitrate (UAN) are gradually replacing anhydrous ammonia as the preferred nitrate fertilizer. As a result, ground water contaminated with UAN is becoming more common. Such contaminated ground water may be found underlying commercial fertilizer dealerships and storage areas and in waters around agricultural areas of the United States, including Iowa, Illinois, Nebraska, Minnesota, Indiana, Texas, and California, as a result of runoff.

Ground water containing UAN can be pumped from the ground and used for crop irrigation, with the UAN serving as a source of fertilizer for the crops. Although irrigation presents a use for UAN contaminated ground water, it does not always present a feasible alternative use. Additionally, runoff or other discharge of the irrigation water to nearby surface waters must be avoided to prevent degradation of the water quality. The presence of nitrogen compounds in surface waters can be detrimental because the nitrogen compounds serve as a nutrient source for undesirable phytoplankton and phytobacteria and can lead to fouling of the water, including eutrophication. For example, ammonia in low concentrations is extremely toxic to fish. Ammonia in ground water can also be nitrified to nitrate and in the nitrate form is toxic to infants. Thus, it may be desired to treat the ground water to reduce the concentrations of nitrogen compounds.

Waste water streams that are discharged from industrial sites such as fertilizer factories, dye factories, livestock feed factories, and electric power plants are known to contain inorganic and organic nitrogen compounds, including ammonia, hydrazine, nitric acid, nitrate, nitrite, and urea. The concentrations of the nitrogen compounds typically can be very high. Because of the high concentrations of nitrogen compounds percolation of theses wastes adversely affects ground water quality. As a result, conventional methods for treating such waste water can be complex and costly.

There remains a need for an efficient, cost-effective method for treating ground water to reduce the concentrations of nitrogen compounds present in the ground water. There also remains a need for treatment processes that avoid the formation of harsh chemicals as byproducts, thereby allowing for the environmentally safe discharge of the ground water.

SUMMARY OF THE INVENTION

The present invention is directed to processes for treating ground water contaminated with urea, ammonia, and nitrate (UAN). Generally, the treatment process may be performed in two separate stages. In a first stage, ammonia and urea in the ground water are treated in an above-ground abiotic process. In a second stage, nitrate is removed through biodenitrification processes. The treated ground water is suitable for discharge to ground water or surface water generally without causing adverse effects on the body of water to which it is discharged.

In the first stage, ground water is pumped from extraction wells. A chemical oxidant is injected in-line with the extracted water in stoichiometric or greater concentrations effective for oxidizing ammonia and urea. An important advantage of this reaction is the oxidation of ammonia and urea to nitrogen gas, an innocuous gas that is released to the atmosphere, particularly when the reaction vessels in which the water is treated are left open to the atmosphere. After the oxidative treatment of ammonia and urea, residual chemical oxidant may be removed from the water as desired to enhance the quality.

In other embodiments, the treated ground water having substantially no ammonia and urea may then be further processed as desired to remove nitrates. In the second stage, the water may be re-injected into an aquifer in a controlled process for in situ biodenitrification of nitrate. In other embodiments, the ground water may be treated above-ground by biodenitrification or other suitable method for removing nitrates and discharged to surface water or re-injected to the aquifer.

DETAILED DESCRIPTION OF THE PREFERRED EMBODIMENTS

Figure 1:
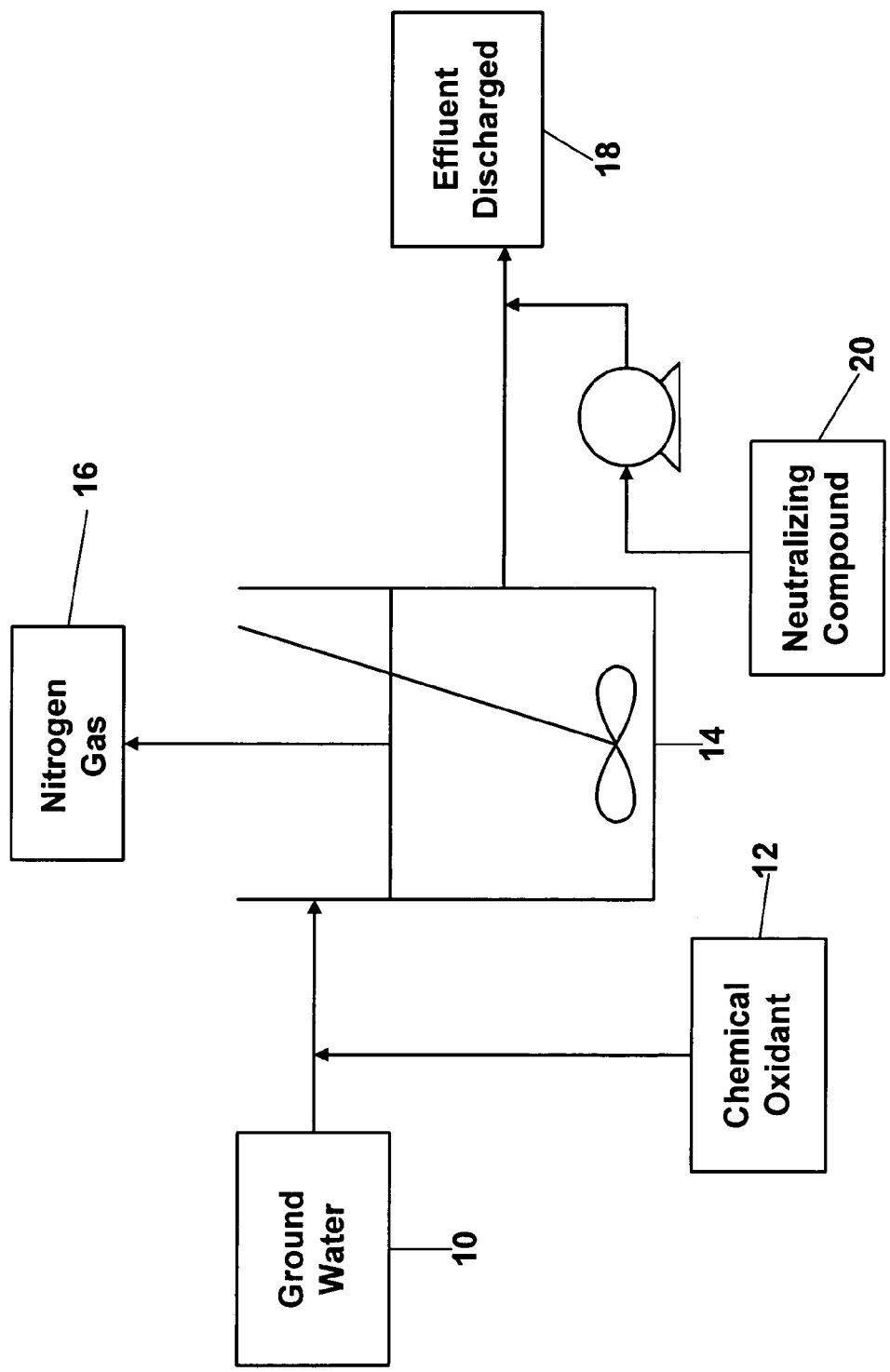
FIG. 1 is a schematic flow diagram of a process for treating ground water containing ammonia and urea in accordance with an embodiment of the invention.

Referring to FIG. 1, there is illustrated a process for treating ground water containing nitrogen compounds such as ammonia and urea in accordance with an embodiment of the invention. Contaminated ground water 10 is piped to one or more reaction tanks 14. A chemical oxidant 12 is injected in-line with the ground water either upstream of or at the reaction tank 14. The ground water and chemical oxidant are held in the one or more reaction tanks 14 preferably with continuous stirring for a time effective for oxidizing substantially all of the nitrogen compounds to nitrogen gas. The formed nitrogen gas is removed from the water such as by venting to the atmosphere 16. After the oxidation of the nitrogen compounds has proceeded to a predetermined degree, the reaction tanks 14 are emptied by pumping to a discharge site 18. Prior to discharge 18, the water is further processed to reduce residual chemical oxidant, which could adversely impact water quality if discharged untreated, to a predetermined concentration. Preferably, residual oxidant is neutralized with in-line mixing with a compound effective for neutralizing the residual oxidant 20 such as sodium sulfite or similar compound.

Generally, the water is mixed with a chemical oxidant in an amount and for a time effective for oxidizing substantially all of the ammonia nitrogen and urea nitrogen. Typically, stoichiometric amounts of the chemical oxidant are mixed with the ground water, although amounts in excess of the stoichiometric amount can be used to better ensure that the oxidation proceeds more closely to completion. Preferably, the chemical oxidant is mixed with the ground water in amounts of no more than about 15% excess, more preferably about 10% excess or less, to limit the presence of residual oxidant or the occurrence of unwanted side reactions.

Any suitable chemical oxidant can be mixed with the ground water to produce nitrogen gas. Preferably, the chemical oxidant is an alkali metal hypochlorite, an alkaline earth metal hypochlorite, an alkali metal hypobromite, an alkaline earth metal hypobromite, an alkali metal hypoiodite, or an alkaline earth metal hypoiodite. The chemical oxidant also can be Fentons reagent ($H_2O_2$—$Fe^{2+}$). By way of example, when sodium hypochlorite is used as the chemical oxidant, the oxidation of ammonium and urea proceeds according to the following reactions.

$$2NH_4^+ + 3NaOCl \rightarrow N_2 + 3Na^+ + 3Cl^- + 2H^+ + 3H_2O \tag{I}$$

$$H_2N-CO-NH_2 + 3NaOCl \rightarrow N_2 + CO_2 + 3Na^+ + 3Cl^- + 2H_2O \tag{II}$$

Thus, 1 mole of $NH_4$—N is oxidized by 3/2 mole of hypochlorite and 1 mole of urea is oxidized by 3 moles of hypochlorite.

The pH of the ground water prior to treatment is site specific. Although it will depend at least in part on the buffer capacity of the ground water, pH of the ground water likely is between about 6 to about 8 in most cases. A pH above or below this range also is contemplated as falling within the scope of the present invention. Generally, ground water is expected to have a significant buffer capacity. Thus, if acid is produced by reaction during treatment, it could be expected that the ground water will be buffered. In other embodiments, a suitable buffer such as bicarbonate or phosphate can be added to the extracted water to enhance its buffer capacity.

The extraction wells are designed to optimize extraction of N-contaminated ground water and accommodate the site specific contaminant hydrology. Preferably, the extraction wells are sited across the plume of contamination and down gradient of the source of contamination. Pumping is conducted at a rate that promotes capture of the source area loading.

The chemical oxidant is mixed with extracted ammonia- and urea-contaminated water. The extracted water and chemical oxidant are mixed preferably with continuous stirring. The extracted water is held in the reaction vessel for a time effective for allowing the oxidation of ammonia and urea to proceed substantially to completion. The process can be operated in batch or continuous mode, or a combination of both, so long as substantially complete oxidation is achieved. The pumping rates of the ground water are maintained so that the reaction has sufficient or even excess time to go to completion.

The treated water can be processed further as desired to treat residual oxidant or any compounds resulting from any unwanted side reactions. If formation of trihalomethanes (THMs) is a potential concern, the water can be held with mixing for an additional period as desired to volatilize any THMs that may be formed from the interaction of the chemical oxidant with organic matter in the ground water. Because THMs have high vapor pressures, they are easily volatilized from aqueous solution to the atmosphere. Preferably, the reaction vessel is open to the atmosphere to allow volatilization.

Residual oxidant remaining after oxidation of ammonia and urea can be neutralized by any suitable method. For example, when a hypochlorite compound is used as the oxidant, residual hypochlorite is dechlorinated by in-line injection and mixing with a suitable dechlorinating compound such as sodium sulfite. The reaction is as follows.

$$Na_2SO_3 + NaOCl \rightarrow Na_2SO_4 + Na^+ + Cl^- \tag{III}$$

Dechlorination can be accomplished with in-line mixing. Such treatment may be desired to protect t microbial population in aquifers, wetlands and in above-ground reactors. Hypochlorite, which acts as a disinfectant in aqueous solutions, can decimate the microbial population. Preferably, the neutralization of hypochlorite is substantially complete, with the final concentration of hypochlorite being below detection levels.

The water, which is free of ammonia and urea, as well as residual oxidant and other compounds, can be discharged from the treatment process as desired. The treated ground water can be discharged to surface waters or re-injected to the aquifer. Depending on the location of discharge denitrification or other additional treatment may be desired to comply with regulatory and other standards relating to the quality of the water.

Figure 2:
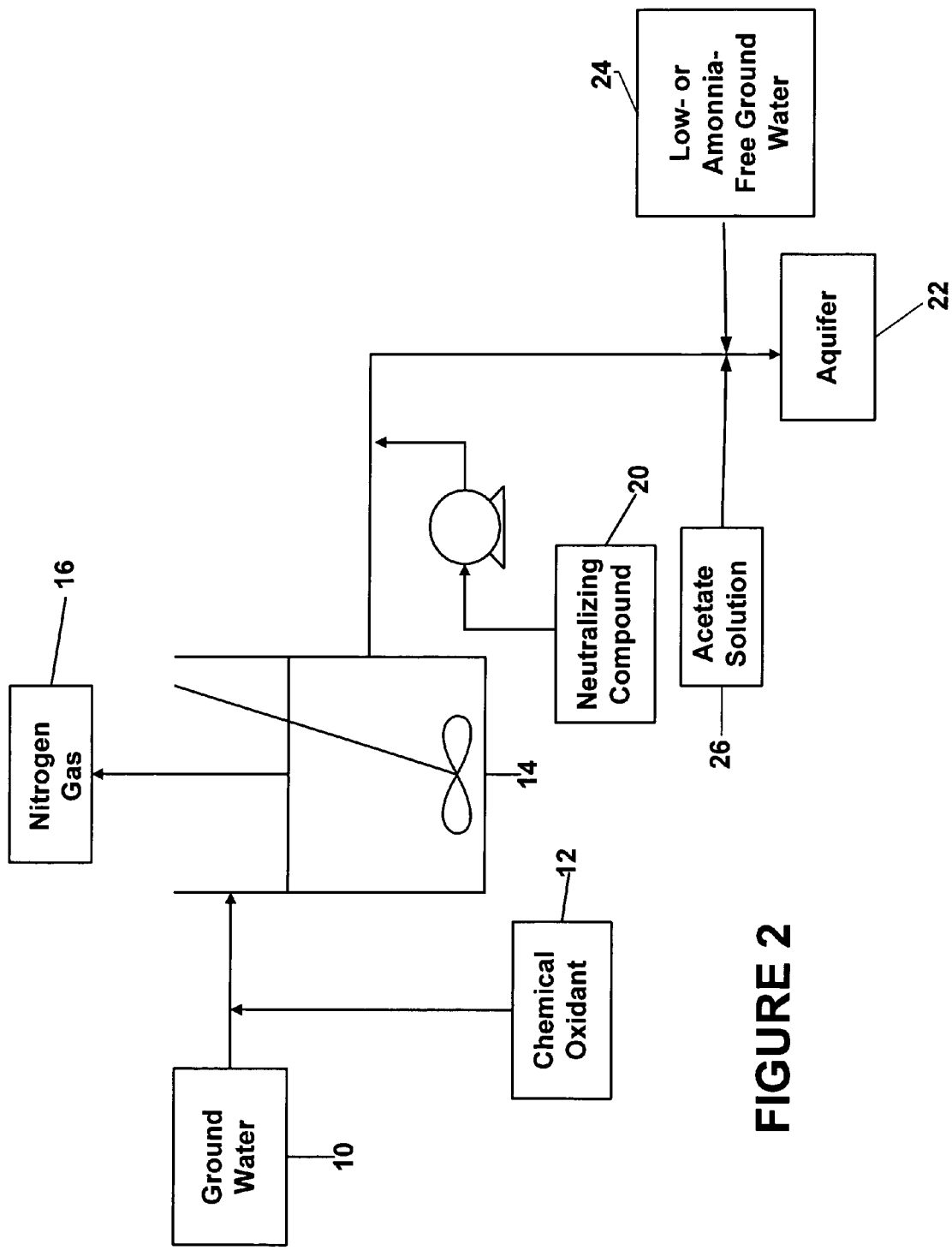
FIG. 2 is a schematic flow diagram of a process for treating ground water containing nitrogen compounds in accordance with another embodiment of the invention.

Referring to FIG. 2, there is illustrated a two-stage process in accordance with another embodiment of the invention for treating ground water containing nitrogen compounds such as ammonia, urea and nitrate. In FIG. 2, like features as shown in FIG. 1 are designated by like numerals. Thus, in a first stage of the process, contaminated ground water 10 is treated with chemical oxidant 12 in one or more reaction tanks 14 to oxidize the ammonia and urea to nitrogen gas 16 as described above with reference to FIG. 1. After treatment 20 to reduce residual oxidant, the water is re-injected to the aquifer 22. Re-injection of the ground water is cycled with injection of low- or ammonia-free ground water 24 and acetate solution 26 to provide an in situ process for denitrification of the re-injected ground water.

The ground water is re-injected to the aquifer from which it was extracted for above-ground treatment. The location and number of injection wells are selected to limit the effects of re-injecting the ground water. Preferably, the injection wells are positioned down gradient of the contamination source within the plume of contamination but a sufficient distance from the extraction wells. Injection wells are positioned to avoid any reversal of the flow of ground water. Additionally, the extraction and injection wells are spaced a sufficient distance apart also to avoid recirculation of the same treated ground water.

Initially, nitrate-free or low-nitrate water is injected into the aquifer. This water radially displaces the ground water having elevated concentrations of nitrate to limit biomass proliferation at the well screens when the carbon source is subsequently injected. The low nitrate water pulse may vary between about 20 minutes to one hour. The carbon source then is injected at a concentration effective for reducing dissolved oxygen concentrations and promoting complete denitrification. For example, with acetate as the carbon source, the reaction is as follows.

$$34NO_3^- + 50CH_3COO^- + 34H^+ \rightarrow 12N_2 + 10C_5H_7O_2N + 50HCO_3^- + 32H_2O \tag{IV}$$

Accordingly, about 1.5 moles of acetate are consumed in the denitrification of 1 mole of nitrate. The carbon solution is pushed radially outward from the well screens by injecting nitrate-free water.

Next the ammonia- and urea-free water from the above-ground treatment process is injected under pressure into the formation. The injection rates generally can be determined based on the site-specific contaminant hydrology. Nitrate concentrations in the ground water after the in situ treatment process preferably are reduced to a sufficiently low concentration to be in compliance with drinking water and other regulatory standards.

The entire two-stage process can be automatically controlled, if desired. The extraction of the UAN-contaminated ground water for above-ground abiotic treatment and the subsequent injection of the ammonia- and urea-free water by biodenitrification are carried out in alternating cycles.

EXAMPLES

The following examples further illustrate preferred embodiments of the present invention but are not to be construed as in any way limiting the scope of the present invention as set forth in the appended claims. These example illustrates the oxidation of ground water containing varying concentrations of ammonia and/or urea.

Standard Test Procedures

Twenty-milliliter (ml) samples of water containing ammonium and/or urea were added to empty 40 ml VOC vials, which were used to prevent loss of ammonia. Five ml of a 6% solution of oxidant were added to each of the vials. Oxidants included $OCl^-$ and $OBr^-$. The vials were manually shaken for about 2 minutes. The vials were stored at 4° C. until analyzed for residual ammonium and/or urea.

Duplicate samples (denoted as A and B) of the oxidized ground water were analyzed. The enzyme urease (1%) and pH 7.5 buffer were added to the "A" samples. "A" and "B" samples were analyzed for ammonium-N using a flow injection analysis (Lachat Instruments, Ammonia (Phenolate) in soils. Quick Chem. Method No. 12-107-06-1-B, Milwaukee, Wis., 1993). The concentration of residual urea in the samples was calculated by subtracting the ammonium-N concentration of the "B" sample from the ammonium-N concentration in the "A" sample. In this method, urea in aqueous solution with urease produces two ammonium molecules and carbon dioxide ($CO_2$). It was determined that 1 ml of a 1% urease solution in a 20-ml sample aliquot could dissociate as much as 1000 mg/l urea-N to ammonium and $CO_2$. Analysis of 50, 500, and 1000 mg/l urea-N standards treated with urease indicated that the mean concentrations and standard deviations were 52.1±0.4 mg/l, 503±3.2 mg/l, and 998.9±2.5 mg/l, as shown in Table 1.

TABLE 1

| Sample ID | Dilution Factor | $NH_4$-N (mg/l) | Calculated Urea-N (mg/l) |
|---|---|---|---|
| 50 STD-A-U[1] | 1.55 | 33.6 | 52.1 |
| 50 STD-B-U | 1.55 | 33.9 | 52.5 |
| 50 STD-C-U | 1.55 | 33.4 | 51.7 |
| | | | Ave. = 52.1; SD = ±0.4 |
| 500 STD-A-U | 1.55 | 322.6 | 500.0 |
| 500 STD-B-U | 1.55 | 324.6 | 503.2 |
| 500 STD-C-U | 1.55 | 326.6 | 506.3 |
| | | | Ave. = 503.1; SD = ±3.2 |
| 1000 STD-A-U | 1.55 | 643.0 | 996.7 |
| 1000 STD-B-U | 1.55 | 646.2 | 1001.6 |
| 1000 STD-C-U | 1.55 | 644.2 | 998.5 |
| | | | Ave. = 998.9; SD = ±2.5 |

[1]20 ml sample + 10 ml buffer + 1 ml urea

The reaction proceeded rapidly, with numerous bubbles of nitrogen gas being observed in the vials during the two minutes of manual shaking. Generally, oxidation of ammonium and urea to nitrogen gas was essentially complete, and concentrations in samples "A" and "B" typically were below detection levels.

Example 1

Fortified water samples having urea-N concentrations of 50, 500 and 1000 mg/l were prepared in accordance with the standard test procedure above. Hypobromite in appropriate concentrations was used as the oxidant. The results are set forth in Table 2.

TABLE 2

| Sample ID | Dilution Factor | $NH_4$-N (mg/l) | Calculated Urea-N (mg/l) |
|---|---|---|---|
| 50 STD A OBr[1] | 1.14 | 0.0 | 0.0 |
| 50 STD B OBr | 1.14 | 0.0 | 0.0 |
| 50 STD C OBr | 1.14 | 0.0 | 0.0 |
| 500 STD A OBr | 1.14 | 0.0 | 0.0 |
| 500 STD B OBr | 1.14 | 0.0 | 0.0 |
| 500 STD C OBr | 1.14 | 0.0 | 0.0 |
| 1000 STD A OBr | 1.14 | 2.9 | 0.0 |
| 1000 STD B OBr | 1.14 | 3.3 | 0.0 |
| 1000 STD C OBr | 1.14 | 3.1 | 0.0 |
| 50 STD A1-U OBr[2] | 1.70 | 0.0 | 0.0 |
| 50 STD B1-U OBr | 1.70 | 0.0 | 0.0 |
| 50 STD C1-U OBr | 1.70 | 0.0 | 0.0 |
| 500 STD A1-U OBr | 1.70 | 0.0 | 0.0 |
| 500 STD B1-U OBr | 1.70 | 0.0 | 0.0 |
| 500 STD C1-U OBr | 1.70 | 0.0 | 0.0 |
| 1000 STD A1-U OBr | 1.70 | 243.8 | 414.5 |
| 1000 STD B1-U OBr | 1.70 | 229.7 | 390.5 |
| 1000 STD C1-U OBr | 1.70 | 228.8 | 389.0 |
| 50 STD U Control[3] | 1.55 | 38.9 | 60.4 |
| 500 STD U Control | 1.55 | 352.3 | 546.1 |
| 1000 STD U Control | 1.55 | 654.1 | 1013.8 |
| 500 STD A OBr[4] | 1.15 | 0.0 | 0.0 |
| 500 STD B OBr | 1.15 | 0.0 | 0.0 |
| 500 STD C OBr | 1.15 | 0.0 | 0.0 |
| 1000 STD A OBr[5] | 1.25 | 0.0 | 0.0 |
| 1000 STD B OBr | 1.25 | 0.0 | 0.0 |
| 1000 STD C OBr | 1.25 | 0.0 | 0.0 |
| 500 STD A1-U OBr[6] | 1.70 | 0.0 | 0.0 |
| 500 STD B1-U OBr | 1.70 | 0.0 | 0.0 |
| 500 STD C1-U OBr | 1.70 | 0.0 | 0.0 |
| 1000 STD A1-U OBr[7] | 1.80 | 0.0 | 0.0 |
| 1000 STD B1-U OBr | 1.80 | 0.0 | 0.0 |
| 1000 STD C1-U OBr | 1.80 | 0.0 | 0.0 |

[1]35 ml sample + 5 ml OBr
[2]20 ml sample + 10 ml buffer + 1 ml urea + 3 ml OBr
[3]20 ml sample + 10 ml buffer + 1 ml urea
[4]20 ml sample + 3 ml OBr
[5]20 ml sample + 5 ml OBr
[6]20 ml sample + 10 ml buffer + 1 ml urea + 3 ml OBr
[7]20 ml sample + 10 ml buffer + 1 ml urea + 5 ml OBr As illustrated by the data of Table 2, oxidation of urea-N was substantially complete with hypobromite.

Example 2

Fortified water samples having or urea-N concentrations of 500 and 1000 mg/l were prepared in accordance with the standard test procedure above. Hypochlorite in varying concentration was used as the oxidant. The results are set forth in Table 3.

TABLE 3

| Sample ID | Dilution Factor | $NH_4$-N (mg/l) | Calculated Urea-N (mg/l) |
|---|---|---|---|
| 500 STD A OCl[1] | 1.15 | 0.0 | 0.0 |
| 500 STD B OCl | 1.15 | 0.0 | 0.0 |
| 500 STD C OCl | 1.15 | 0.0 | 0.0 |
| 1000 STD A OCl[2] | 1.25 | 0.0 | 0.0 |
| 1000 STD B OCl | 1.25 | 0.0 | 0.0 |
| 1000 STD C OCl | 1.25 | 0.0 | 0.0 |

TABLE 3-continued

| Sample ID | Dilution Factor | $NH_4$-N (mg/l) | Calculated Urea-N (mg/l) |
|---|---|---|---|
| 500 STD A1-U OCl[3] | 1.70 | 0.0 | 0.0 |
| 500 STD B1-U OCl | 1.70 | 0.0 | 0.0 |
| 500 STD C1-U OCl | 1.70 | 0.0 | 0.0 |
| 1000 STD A1-U OCl[4] | 1.80 | 0.0 | 0.0 |
| 1000 STD B1-U OCl | 1.80 | 0.0 | 0.0 |
| 1000 STD C1-U OCl | 1.80 | 0.0 | 0.0 |
| 500 STD U Control[5] | 1.55 | 261.7 | 405.6 |
| 1000 STD U Control | 1.55 | 487.9 | 756.3 |

[1] 20 ml sample + 3 ml OCl
[2] 20 ml sample + 5 ml OCl
[3] 20 ml sample + 10 ml buffer + 1 ml urea + 3 ml OCl
[4] 20 ml sample + 10 ml buffer + 1 ml urea + 5 ml OCl
[5] 20 ml sample + 10 ml buffer + 1 ml urea Example 3

Ground water samples containing 91 mg/l ammonium-N and 222 mg/l urea-N were prepared and oxidized in accordance with the standard test procedure above. A 500 mg/l urea-N standard also was prepared. Hypochlorite and hypobromite were used separately as the chemical oxidant. The results are set forth in Table 4.

TABLE 4

| Sample ID | $NH_4$-N (mg/l) | Urea-N (mg/l) |
|---|---|---|
| MW 12 | 91.18 | 221.53 |
| MW 12-OBr | 0.00 | 0.00 |
| MW 12-OCl | 0.00 | 0.00 |
| 500 STD | 0.00 | 499.24 |
| 500 STD-OBr | 0.00 | 0.00 |
| 500 STD-OCl | 0.00 | 0.00 |

As illustrated by the data of Table 4, oxidation of urea-N and ammonium-N in the ground water samples was substantially complete with hypochlorite and hypobromite.

Example 4

Ground water samples from three different sources and containing 105 mg/l ammonium-N and 89 mg/l urea-N, 34 mg/l ammonium-N and 255 mg/l urea-N, and 39 mg/l ammonium-N and 20 mg/l urea-N, respectively, were prepared and oxidized in accordance with the standard test procedure above. Hypochlorite and hypobromite were used separately as the chemical oxidant. The results are set forth in Table 5.

TABLE 5

| Sample ID | $NH_4$-N (mg/l) | Urea-N (mg/l) |
|---|---|---|
| MW 3 | 105.15 | 88.57 |
| MW 3-OBr | 0.00 | 0.00 |
| MW 3-OCl | 0.00 | 0.00 |
| MW 12 | 33.52 | 254.87 |
| MW 12-OBr | 0.00 | 0.00 |
| MW 12-OCl | 0.00 | 0.00 |
| MW 13 | 39.17 | 19.53 |
| MW 13-OBr | 0.00 | 0.00 |
| MW 13-OCl | 0.00 | 0.00 |

As illustrated by the data of Table 5, oxidation of urea-N and ammonium-N in the three ground water samples was substantially complete with hypochlorite and hypobromite.

Example 5

Ground water is remediated beneath a UAN storage pit. The remediation is designed as a two-stage process. First, ammonia and urea in the ground water are treated above ground in an abiotic treatment process. Second, nitrate in the ground water is remediated in situ by biodenitrification.

In Stage 1, ground water is pumped from six extraction wells located down gradient of the source of UAN. Four-inch diameter wells screened from about 80 feet to about 105 feet below the ground surface are used to extract the ground water at a rate of about 7 gallons per minute (gpm) per well. The extraction wells are constructed to optimize removal of the UAN-contaminated ground water in a zone of relatively high hydraulic conductivity 80 to 105 feet beneath the ground surface. Based on plume delineation and particle transport models, six 4-inch diameter PVC wells are used. The wells are positioned across the UAN plume and immediately down gradient of the storage pit. The wells are pumped at a combined rate of about 42 gpm to remove the UAN-contaminated ground water at the source loading area.

From the extraction wells, the ground water is pumped to three 3000 gallon above-ground tanks open to the atmosphere. The tanks are connected in parallel. The extraction wells are operated until the mixing tanks are substantially filled with ground water. Prior to being pumped to the mixing tanks a 6% solution of NaOCl is injected in-line with the extracted UAN-contaminated water. Essentially stoichiometric concentrations of NaOCl are injected into the ground water to oxidize the ammonia nitrogen and urea nitrogen. In this aspect, it is anticipated that 1 mole of ammonium-N is oxidized by 3/2 mole of hypochlorite, and 1 mole of urea-N is oxidized by 3 moles of hypochlorite. The ratio of ammonia and urea nitrogen to NaOCl is about 1:8 based on weight.

The ground water and NaOCl are mixed continuously in the tanks for the approximately 2-hour filling period, as well as for an additional hour after the tanks are filled. During this three-hour period, the urea and ammonia are completely oxidized to nitrogen gas ($N_2$), which is released to the atmosphere from the open mixing tanks. Trihalomethanes (THMs) are stripped from solution. THMs are formed in the mixing tanks from the interaction of hypochlorite and dissolved organic carbon compounds in the ground water. Because THMs have high vapor pressures, they are easily volatilized from aqueous solution and released to the atmosphere.

The residual hypochlorite from the oxidation of the ammonia nitrogen and urea nitrogen is dechlorinated through a treatment process with sodium sulfite. Stoichiometric amounts sodium sulfite are injected and mixed in-line with the ground water effluent from the mixing tanks. The ratio of hypochlorite to sodium sulfite is about 1:2.5 based on weight. The dechlorination process is selected to provide a treated water of a quality sufficient for protecting the aquifer's endemic microbial population against residual hypochlorite, which is a known disinfectant in aqueous solutions, upon re-injection of the treated ground water into the aquifer.

The treated ground water from the first stage, which is substantially free of urea, ammonia, and residual hypochlorite, is reinjected into the aquifer from which it is extracted and down gradient of the source of contamination as sufficient distance from the extraction wells to limit interference between the wells. The ground water is injected using 6-inch diameter PVC injection wells equipped with inflatable packers for pressure injection. In order to limit biomass being stimulated at and/or near the injection well screens, which can result from having both nitrate and carbon (as acetate) present together, acetate and nitrate-contaminated water are injected separately. Injections of nitrate-free or low-nitrate water are scheduled between the injections of acetate and nitrate-contaminated water, and injection of nitrate-free or low-nitrate water occur first. The injected nitrate-free or low-nitrate water radially displaces high nitrate ground water adjacent the injection well with low nitrate water so that when acetate subsequently is injected, biomass does not proliferate at the well screens. The low-nitrate water is injected at about 10 gpm for about 15 minutes.

Acetate solution at a concentration effective for reducing dissolved oxygen and promoting substantially complete denitrification is injected at a rate of about 10 gpm for about 30 minutes. Based on the stoichiometry of the reaction, about 1.5 moles of acetate are consumed in the denitrification of 1 mole of nitrate. The ratio of nitrate nitrogen to acetate solution is about 1:8.6 based on weight. After about 30 minutes, nitrate-free water is injected for about 15 minutes to push the acetate solution radially outward from the well screens. Then the treated ground water from Stage 1 (substantially free of ammonia and urea) is injected for about 1 hour at about 10 gpm. The re-injected water is pushed out into the formation by the force of re-injection.

The entire two-stage remediation process can be automatically controlled. Both the extraction of the UAN-contaminated ground water with above ground abiotic treatment and the injection of the urea/ammonia-free water with in situ biodenitrification are designed to be operated in separate three-hour cycles such that during the extraction stage the injection stage is not operated and vice versa.

While particular embodiments of the present invention have been described and illustrated, it should be understood that the invention is not limited thereto because modifications may be made by persons skilled in the art. The present application contemplates any and all modifications that fall within the spirit and scope of the underlying invention disclosed and claimed herein.

What is claimed is:

1. A method of removing ammonia and urea from ground water, comprising the steps of:
   (a) removing ammonia nitrogen and urea nitrogen from the ground water by oxidizing the ammonia nitrogen and urea nitrogen to nitrogen gas by mixing with a chemical oxidant, wherein the concentrations of ammonia nitrogen and urea nitrogen initially are up to about 5000 mg/l;
   (b) removing residual oxidant by contacting the ground water with an effective amount of dechlorinating compound; and
   c) volatilizing trihalomethane compounds formed during oxidation of ammonia nitrogen and urea nitrogen.

2. The method of claim 1 wherein the chemical oxidant is selected from the group consisting of an alkali metal hypochlorite, an alkaline earth metal hypochlorite, an alkali metal hypobromite, an alkaline earth metal hypobromite, an alkali metal hypoiodite, an alkaline earth metal hypoiodite, and Fentons reagent and combinations thereof.

3. The meted of claim 2 wherein the chemical oxidant is sodium hypoidite.

4. The method of claim 1 wherein the amount of the chemical oxidant is no more than about 1.15 times a stoichiometric amount of chemical oxidant required for reacting with the ammonia nitrogen and urea nitrogen.

5. The method of claim 4 wherein the amount of the chemical oxidant is between about 1.0 and about 1.1 times a stoichiometric amount of chemical oxidant required for reacting with the ammonia nitrogen and urea nitrogen.

6. The method of claim 1 wherein the concentrations of ammonia nitrogen and urea nitrogen initially are between about 100 to about 1000 mg/l.

7. The method of claim 1 wherein the pH of the ground water is maintained at between about 6 to about 8 during treatment.

8. A method of treating ground water containing nitrogen compounds comprising the steps of:
   (a) extracting the ground water containing nitrogen compounds from the ground to an above-ground treatment site;
   (b) reacting the ground water with an oxidizing compound to remove the nitrogen compounds, the oxidizing compound in an amount effective for oxidizing the nitrogen compounds to nitrogen gas, wherein the nitrogen gas subsequently is evolved from the ground water;
   (c) reacting the ground water and oxidizing compound with a dechlorinating compound to remove residual oxidant; and
   (d) volatilizing trihalomethane compounds formed during oxidation of the nitrogen compounds.

9. The method of claim 8 wherein the oxidizing compound is selected from the group consisting of an alkali metal hypochlorite, an alkaline earth metal hypochlorite, an alkali metal hypobromite, an alkaline earth metal hypobromite, an alkali metal hypoiodite, an alkaline earth metal hypoiodite, and Fentons reagent and combinations thereof.

10. The method of claim 9 wherein the oxidizing compound is an alkali metal hypochlorite or alkaline earth metal hypochlorite.

11. The method of claim 10 wherein the oxidizing compound is sodium hypochlorite.

12. The method of claim 8 wherein the amount of the oxidizing compound is between about 1.0 and about 1.15 times a stoichiometric amount of oxidizing compound required for reacting with the ammonia nitrogen and urea nitrogen.

13. The method of claim 8 wherein the concentrations of ammonia nitrogen and urea nitrogen initially are between about 100 to about 1000 mg/l.

14. The method of claim 8 wherein the pH of the ground water is maintained at between about 6 to about 8 during treatment.

15. The method of claim 8 wherein the ground water includes nitrate and comprising the step of subjecting the ground water to a denitrification process to reduce the concentration of nitrate in the ground water.

16. A process for treating nitrogen-contaminated ground water comprising the steps of:
   (a) extracting the ground water from an aquifer, the ground water including ammonia, urea or nitrate and combinations thereof;
   (b) mixing the ground water with a chemical oxidant selected from the group consisting of an alkali metal hypochlorite, an alkaline earth metal hypochlorite, an alkali metal hypobromite, an alkaline earth metal hypobromite, an alkali metal hypoiodite, an alkaline earth metal hypoiodite, and Fentons reagent and combinations thereof;
   (c) oxidizing the ammonia and urea to nitrogen gas, the nitrogen gas being released to the atmosphere;
   (d) removing residual oxidant from the ground water; and
   (e) denitrifying the ground water.

17. A process in accordance with claim 16 further comprising the step of re-injecting the ground water to the aquifer in a predetermined pattern.

18. The process of claim 16 wherein the ground water is re-injected into the aquifer subsequent to removal of residual oxidant and prior to being denitrified.

19. The process of claim 18 wherein the ground water is re-injected in a sequence comprising: (i) injecting water that is substantially free of nitrate compounds, (ii) injecting a carbon source, and (iii) injecting the ground water.

20. The process of claim 16 further comprising volatilizing trihalomethane compounds formed during oxidation of ammonia and urea.

* * * * *